US006191225B1

(12) United States Patent
Barkac et al.

(10) Patent No.: US 6,191,225 B1
(45) Date of Patent: Feb. 20, 2001

(54) THERMOSETTING COMPOSITIONS CONTAINING CARBOXYLIC ACID FUNCTIONAL POLYMERS AND EPOXY FUNCTIONAL POLYMERS PREPARED BY ATOM TRANSFER RADICAL POLYMERIZATION

(75) Inventors: Karen A. Barkac, Murrysville; Simion Coca, Pittsburgh; James R. Franks, Gibsonia; Kurt A. Humbert, Bethel Park; Paul H. Lamers, Allison Park; Roxalana L. Martin, Pittsburgh; James B. O'Dwyer, Valencia; Kurt G. Olson, Gibsonia; Daniela White, Pittsburgh, all of PA (US)

(73) Assignee: PPG Industries Ohio, Inc., Cleveland, OH (US)

( * ) Notice: Under 35 U.S.C. 154(b), the term of this patent shall be extended for 0 days.

(21) Appl. No.: 09/375,016

(22) Filed: Aug. 16, 1999

Related U.S. Application Data

(60) Provisional application No. 60/098,604, filed on Aug. 31, 1998.

(51) Int. Cl.[7] ..................... C08G 59/42; C08F 4/40; C09D 5/03

(52) U.S. Cl. ..................... 525/208; 525/221; 427/327; 427/328; 427/409; 427/410; 428/457; 428/461

(58) Field of Search ..................... 525/208, 221; 427/327, 328, 409, 410; 428/457, 461

(56) References Cited

U.S. PATENT DOCUMENTS

| | | | |
|---|---|---|---|
| 4,147,679 | 4/1979 | Scriven et al. . | |
| 4,220,679 | 9/1980 | Backhouse | 427/401 |
| 4,403,003 | 9/1983 | Backhouse | 427/407.1 |
| 4,937,288 | 6/1990 | Pettit, Jr. et al. | 525/176 |
| 5,071,904 | 12/1991 | Martin et al. | 524/458 |
| 5,763,548 | 6/1998 | Matyjaszewski et al. | 526/135 |
| 5,789,487 | 8/1998 | Matyjaszewski et al. | 525/301 |
| 5,807,937 | 9/1998 | Matyjaszewski et al. | 526/135 |

FOREIGN PATENT DOCUMENTS

| | | |
|---|---|---|
| 0 248 596 A2 | 12/1987 | (EP) . |
| 96/30421 | 10/1996 | (WO) . |
| 97/18247 | 5/1997 | (WO) . |
| 98/01480 | 1/1998 | (WO) . |
| 98/40415 | 9/1998 | (WO) . |

*Primary Examiner*—Nathan M. Nutter
(74) *Attorney, Agent, or Firm*—William J. Uhl

(57) ABSTRACT

A thermosetting composition comprising a co-reactable solid, particulate mixture of (a) polycarboxylic acid functional polymer, and (b) epoxy functional polymer, is described. The polycarboxylic acid functional polymer and epoxy functional polymer are each prepared by atom transfer radical polymerization and have well defined polymer chain architecture and polydispersity index of less than 2.5. The thermosetting compositions of the present invention have utility as powder coatings compositions.

72 Claims, No Drawings

THERMOSETTING COMPOSITIONS CONTAINING CARBOXYLIC ACID FUNCTIONAL POLYMERS AND EPOXY FUNCTIONAL POLYMERS PREPARED BY ATOM TRANSFER RADICAL POLYMERIZATION

CROSS-REFERENCE TO RELATED APPLICATION

This application claims the benefit of U.S. Provisional application Ser. No. 60/098604, filed Aug. 31, 1998, which is hereby incorporated by reference.

FIELD OF THE INVENTION

The present invention relates to thermosetting compositions of one or more polycarboxylic acid functional polymers and one or more epoxy functional polymers. The polycarboxylic acid functional polymer and epoxy functional polymer are each prepared by atom transfer radical polymerization, and have well defined polymer chain structure, molecular weight and molecular weight distribution. The present invention also relates to methods of coating a substrate, substrates coated by such methods, and composite coating compositions.

BACKGROUND OF THE INVENTION

Reducing the environmental impact of coatings compositions, in particular that associated with emissions into the air of volatile organics during their use, has been an area of ongoing investigation and development in recent years. Accordingly, interest in powder coatings has been increasing due, in part, to their inherently low volatile organic content (VOC), which significantly reduces air emissions during the application process. While both thermoplastic and thermoset powder coatings compositions are commercially available, thermoset powder coatings are typically more desirable because of their superior physical properties, e.g., hardness and solvent resistance.

Low VOC coatings are desirable in the automotive original equipment manufacture (OEM), industrial and appliance markets, due to the relatively large volume of coatings that are used. However, in addition to the requirement of low VOC levels, manufacturers typically have very strict performance requirements of the coatings that are used. For example, automotive OEM clear top coats are typically required to have a combination of good exterior durability, acid etch and water spot resistance, and excellent gloss and appearance. While liquid top coats, in particular epoxy-acid cured liquid coatings, can provide such properties, they have the undesirable drawback of higher VOC levels relative to powder coatings, which have essentially zero VOC levels.

Epoxy based powder coatings, such as epoxy-acid powder coatings, are known and have been developed for use in automotive, industrial and appliance applications. However, their use has been limited due to deficiencies in, for example, flow, appearance and storage stability. Epoxy based powder coating compositions typically comprise a carboxylic acid functional component, e.g., an acrylic copolymer prepared in part from (meth)acrylic acid, and an epoxy functional component, e.g., an acrylic copolymer prepared in part from glycidyl methacrylate. The carboxylic acid functional and epoxy functional polymers used in such epoxy-acid cured powder coatings compositions are typically prepared by standard, i.e., non-living, radical polymerization methods, which provide little control over molecular weight, molecular weight distribution and polymer chain structure.

The physical properties, e.g., glass transition temperature (Tg) and melt viscosity, of a given polymer can be directly related to its molecular weight. Higher molecular weights are typically associated with, for example, higher Tg values and melt viscosities. The physical properties of a polymer having a broad molecular weight distribution, e.g., having a polydispersity index (PDI) in excess of 2.0 or 2.5, can be characterized as an average of the individual physical properties of and indeterminate interactions between the various polymeric species that comprise it. As such, the physical properties of polymers having broad molecular weight distributions can be variable and hard to control.

The polymer chain structure, or architecture, of a copolymer can be described as the sequence of monomer residues along the polymer backbone or chain. For example, a copolymer containing reactive group functionality, e.g., oxirane or carboxylic acid functionality, prepared by standard radical polymerization techniques will contain a mixture of polymer molecules having varying individual reactive group equivalent weights. Some of these polymer molecules can actually be free of reactive group functionality. In a thermosetting composition, the formation of a three dimensional crosslinked network is dependent upon the functional equivalent weight as well as the architecture of the individual polymer molecules that comprise it. Polymer molecules having little or no reactive functionality (or having functional groups that are unlikely to participate in crosslinking reactions due to their location along the polymer chain) will contribute little or nothing to the formation of the three dimensional crosslink network, resulting in less than desirable physical properties of the finally formed polymerizate, e.g., a cured or thermoset coating.

The continued development of new and improved epoxy-acid cured powder coatings compositions having essentially zero VOC levels and a combination of favorable performance properties is desirable. In particular, it would be desirable to develop epoxy-acid cured powder coatings compositions that comprise carboxylic acid functional polymers and epoxy functional polymers, both of which have well defined molecular weights and polymer chain structure, and narrow molecular weight distributions, e.g., PDI values less than 2.5. Controlling the architecture and polydispersity of both the carboxylic acid polymer and epoxy polymer is desirable in that it enables one to achieve higher Tg's and lower melt viscosities than is possible with comparable carboxylic acid polymers and epoxy polymers prepared by conventional processes, resulting in thermosetting particulate compositions which are resistant to caking and have improved physical properties.

International patent publication WO 97/18247 and U.S. Pat. No. 's 5,763,548 and 5,789,487 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '548 and '487 patents and WO 97/18247 patent publication also describe (co)polymers prepared by ATRP, which are useful in a wide variety of applications, for example, with paints and coatings.

SUMMARY OF THE INVENTION

In accordance with the present invention there is provided, a thermosetting composition comprising a co-reactable solid, particulate mixture of:

(a) polycarboxylic acid functional polymer prepared by atom transfer radical polymerization initiated in the presence of a first initiator having at least one radically transferable group, and in which said polycarboxylic acid functional polymer contains at least one of the following polymer chain structures I and II:

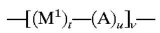

I and

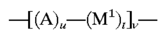

II wherein $M^1$ is a residue, that is free of carboxylic acid functionality, of at least one ethylenically unsaturated radically polymerizable monomer; A is a residue, that has carboxylic acid functionality, of at least one ethylenically unsaturated radically polymerizable monomer; t and u represent average numbers of residues occurring in a block of residues in each polymer chain structure; and t, u and v are each independently selected for each structure such that said polycarboxylic acid functional polymer has a number average molecular weight of at least 250; and (b) epoxy functional polymer prepared by atom transfer radical polymerization initiated in the presence of a second initiator having at least one radically transferable group, and in which said epoxy functional polymer contains at least one of the following polymer chain structures III and IV:

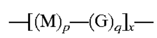

III and

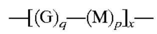

IV wherein M is a residue, that is free of oxirane functionality, of at least one ethylenically unsaturated radically polymerizable monomer; G is a residue, that has oxirane functionality, of at least one ethylenically unsaturated radically polymerizable monomer; p and q represent average numbers of residues occurring in a block of residues in each polymer chain structure; and p, q and x are each independently selected for each structure such that said epoxy functional polymer has a number average molecular weight of at least 250.

In accordance with the present invention, there is also provided a method of coating a substrate with the above described thermosetting composition.

There is further provided, in accordance with the present invention, a multi-component composite coating composition comprising a base coat deposited from a pigmented film-forming composition, and a transparent top coat applied over the base coat. The transparent top coat comprises the above described thermosetting composition.

Other than in the operating examples, or where otherwise indicated, all numbers expressing quantities of ingredients, reaction conditions, and so forth used in the specification and claims are to be understood as modified in all instances by the term "about."

As used herein, the term "polymer" is meant to refer to both homopolymers, i.e., polymers made from a single monomer species, and copolymers, i.e., polymers made from two or more monomer species.

DETAILED DESCRIPTION OF THE INVENTION

Thermosetting compositions in accordance with the present invention, comprise (a) one or more polycarboxylic acid functional polymers, and (b) one or more epoxy functional polymers. As used herein and in the claims, by "polycarboxylic acid functional polymer" and like terms is meant a polymer having two or more carboxylic acid groups in terminal and/or pendent positions that are capable of reacting and forming covalent bonds with epoxide (or oxirane) groups. As used herein and in the claims, by "epoxy functional polymer" is meant a polymer having two or more epoxy (or oxirane) groups in terminal and/or pendent positions that are capable of reacting and forming covalent bonds with reactive hydrogen containing groups, such as carboxylic acid groups.

The carboxylic acid functional polymer and epoxy functional polymer of the present invention are each independently prepared by atom transfer radical polymerization (ATRP). The ATRP method is described as a "living polymerization," i.e., a chain-growth polymerization that propagates with essentially no chain transfer and essentially no chain termination. The molecular weight of a polymer prepared by ATRP can be controlled by the stoichiometry of the reactants, i.e., the initial concentration of monomer(s) and initiator(s). In addition, ATRP also provides polymers having characteristics including, for example, narrow molecular weight distributions, e.g., PDI values less than 2.5, and well defined polymer chain structure, e.g., block copolymers and alternating copolymers.

The ATRP process can be described generally as comprising: polymerizing one or more radically polymerizable monomers in the presence of an initiation system; forming a polymer; and isolating the formed polymer. The initiation system comprises: an initiator having a radically transferable atom or group; a transition metal compound, i.e., a catalyst, which participates in a reversible redox cycle with the initiator; and a ligand, which coordinates with the transition metal compound. The ATRP process is described in further detail in international patent publication WO 97/18247 and U.S. Pat. No. 's 5,763,548 and 5,789,487.

In preparing the carboxylic acid functional polymers and epoxy functional polymers of the present invention, the first and second initiators, respectively, are each independently selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, which is typically a halo group. The initiators may also be substituted with functional groups, e.g., oxyranyl groups, such as glycidyl groups. Additional useful initiators and the various radically transferable groups that may be associated with them are described on pages 42 through 45 of international patent publication WO 97/18247.

Polymeric compounds (including oligomeric compounds) having radically transferable groups may be used as the first and second initiators, and are herein referred to as "macroinitiators." Examples of macroinitiators include, but are not limited to, polystyrene prepared by cationic polymerization and having a terminal halide, e.g., chloride, and a polymer of 2-(2-bromopropionoxy) ethyl acrylate and one or more alkyl (meth)acrylates, e.g., butyl acrylate, prepared by conventional non-living radical polymerization. Macroinitiators can be used in the ATRP process to prepare graft polymers, such as grafted block copolymers and comb copolymers. A further discussion of macroinitiators is found on pages 31 through 38 of international patent publication WO 98/01480.

Preferably, the first and second initiators are each independently selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis($\alpha$-halo-$C_1$–$C_6$-alkyl)benzene, diethyl-2-halo-2-methyl malonate, ethyl 2-bromoisobutyrate and mixtures thereof. A particularly preferred initiator is diethyl-2-bromo-2-methyl malonate.

Catalysts that may be used in preparing the carboxylic acid functional polymers and epoxy functional polymers of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula V, $$TM^{n}X_{n} \qquad V$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halogen, hydroxy, oxygen, $C_1$–$C_6$-alkoxy, cyano, cyanato, thiocyanato and azido. A preferred transition metal is Cu(I) and X is preferably halogen, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, $Cu(II)Cl_2$ when Cu(I)Cl is used. Additional catalysts useful in preparing the polymers of the present invention are described on pages 45 and 46 of international patent publication WO 97/18247. Redox conjugates are described on pages 27 through 33 of international patent publication WO 97/18247.

Ligands that may be used in preparing the carboxylic acid functional polymers and epoxy functional polymers of the present invention, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates.

A preferred class of ligands are the substituted bipyridines, e.g., 4,4'-dialkyl-bipyridyls. Additional ligands that may be used in preparing the polymers of the present invention are described on pages 46 through 53 of international patent publication WO 97/18247.

In preparing the carboxylic acid functional polymers and epoxy functional polymers of the present invention the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3M, for example, from $10^{-3}$M to $10^{-1}$M. As the molecular weight of the polymers can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5\times10^{31\ 2}$:1.

In preparing the carboxylic acid functional polymers and epoxy functional polymers of the present invention, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

Carboxylic acid functional polymers and epoxy functional polymers useful in the thermosetting compositions of the present invention may each be prepared in the absence of solvent, i.e., by means of a bulk polymerization process. Generally, the carboxylic acid functional polymer and epoxy functional polymer are each separately prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, and mixed aromatic solvents such as those commercially available from Exxon Chemical America under the trademark SOLVESSO. Additional solvents are described in further detail on pages 53 through 56 of international patent publication WO 97/18247.

Due to the possible deactivation of some ATRP catalysts, e.g., copper, in the presence of carboxylic acid groups, the above described ATRP process is generally performed in the substantial absence of carboxylic acid functionality. Accordingly, the carboxylic acid functional polymer (a) used in the composition of the present invention is typically prepared in two stages. The first stage involves the ATRP preparation of a precursor of the polycarboxylic acid functional polymer that is substantially free of carboxylic acid functionality ("precursor polymer"). In the second stage, the precursor polymer is converted to the polycarboxylic acid functional polymer (a) of the composition of the present invention. Conversely, as the epoxy functional polymer (b) of the present invention does not typically contain carboxylic acid groups, it is generally prepared in a single stage, i.e., the preparation of a precursor to the epoxy functional polymer is generally not necessary.

The conversion of the precursor polymer to the polycarboxylic acid functional polymer is accomplished using methods known to those of ordinary skill in the art. Such known methods of conversion include, but are not limited to: (a) hydrolyzing residues of alkyl (meth)acrylate monomers, e.g., t-butyl methacrylate, present in the backbone of the precursor polymer; and (b) reacting residues of hydroxy functional ethylenically unsaturated radically polymerizable monomers, e.g., hydroxyethyl methacrylate, present in the backbone of the precursor polymer with cyclic anhydrides, e.g., succinic anhydride.

The epoxy functional polymer and the precursor polymer of the carboxylic acid functional polymer are each typically prepared at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

When the carboxylic acid functional polymer and epoxy functional polymer are each prepared in the presence of a solvent, the solvent is removed after the polymers have each been formed, by appropriate means as are known to those of ordinary skill in the art, e.g., vacuum distillation. Alternatively, the polymer may be precipitated out of the solvent, filtered, washed and dried according to known methods. After removal of, or separation from, the solvent, the carboxylic acid functional polymer and epoxy functional polymer typically each independently have a solids (as measured by placing a 1 gram sample in a 110° C. oven for 60 minutes) of at least 95 percent, and preferably at least 98 percent, by weight based on total polymer weight.

Prior to use in the thermosetting compositions of the present invention, the ATRP transition metal catalyst and its associated ligand are typically separated or removed from the polymer. In the case of the carboxylic acid functional polymer (a), the ATRP catalyst is preferably removed prior to conversion of the precursor polymer to the carboxylic acid functional polymer. Removal of the ATRP catalyst is achieved using known methods, including, for example, adding a catalyst binding agent to the a mixture of the polymer, solvent and catalyst, followed by filtering. Examples of suitable catalyst binding agents include, for example, alumina, silica, clay or a combination thereof. A mixture of the polymer, solvent and ATRP catalyst may be passed through a bed of catalyst binding agent. Alternatively, the ATRP catalyst may be oxidized in situ and retained in the polymer.

The carboxylic functional polymer (a) and epoxy functional polymer (b) may each independently be selected from the group consisting of linear polymers, branched polymers, hyperbranched polymers, star polymers, graft polymers and mixtures thereof. The form, or gross architecture, of the polymer can be controlled by the choice of initiator and monomers used in its preparation. Linear polymers may be prepared by using initiators having one or two radically transferable groups, e.g., diethyl-2-halo-2-methyl malonate and ($\alpha$,$\alpha$'-dichloroxylene. Branched polymers may be prepared by using branching monomers, i.e., monomers containing radically transferable groups or more than one ethylenically unsaturated radically polymerizable group, e.g., 2-(2-bromopropionoxy)ethyl acrylate, p-chloromethylstyrene and diethyleneglycol bis (methacrylate). Hyperbranched polymers may be prepared by increasing the amount of branching monomer used.

Star carboxylic acid functional polymers and star epoxy functional polymers may each be prepared using initiators having three or more radically transferable groups, e.g., hexakis(bromomethyl)benzene. As is known to those of ordinary skill in the art, star polymers may be prepared by core-arm or arm-core methods. In the core-arm method, the star polymer is prepared by polymerizing monomers in the presence of the polyfunctional initiator, e.g., hexakis (bromomethyl)benzene. Polymer chains, or arms, of similar composition and architecture grow out from the initiator core, in the core-arm method.

In the arm-core method, the arms are prepared separately from the core and optionally may have different compositions, architecture, molecular weight and PDI's. The arms may have different functional group equivalent weights, and some may be prepared without any reactive functionality. After the preparation of the arms, they are attached to the core.

In the case of the carboxylic acid functional polymer (a), and for purposes of illustration, the arms (in the form of precursor polymers) may be prepared by ATRP using, for example, epoxide functional initiators. These arms can then be attached to a core having three or more active hydrogen groups that are reactive with epoxides, e.g., carboxylic acid or hydroxyl groups. After attachment to the core, the precursor polymers of the arms can then be converted to carboxylic acid functional arms, as described previously herein. The core can be a molecule, such as citric acid, or a core-arm star polymer prepared by ATRP and having terminal reactive hydrogen containing groups, e.g., carboxylic acid, thiol or hydroxyl groups.

An example of a core prepared by ATRP methods that can be used as a core in an ATRP arm-core star carboxylic acid functional polymer is described as follows. In the first stage, 6 moles of methyl methacrylate are polymerized in the presence of one mole of 1,3,5-tris(bromomethyl)benzene. In the second stage 3 moles of 2-hydroxyethyl methacrylate are fed to the reaction mixture. The core having terminal residues of 2-hydroxyethyl methacrylate is isolated and then in the third stage reacted with a cyclic anhydride, such as succinic anhydride. In the final stage, three ATRP prepared precursor polymer arms of varying or equivalent composition and each containing oxirane functional initiator residues, are connected to the carboxylic acid terminated core by reaction between the carboxylic acid groups of the core and the epoxy functionality of the arms. The precursor polymers of the arms are then converted to carboxylic acid functional arms.

Carboxylic acid functional polymers and epoxy functional polymers each in the form of graft polymers may be prepared using a macroinitiator, as previously described herein. Graft, branched, hyperbranched and star polymers are described in further detail on pages 79 through 91 of international patent publication WO 97/18247.

The polydispersity index (PDI) of carboxylic acid functional polymers and epoxy functional polymers useful in the present invention, are each typically less than 2.5, more typically less than 2.0, and preferably less than 1.8, for example, 1.5. As used herein, and in the claims, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

General polymer chain structures I and II together or separately represent one or more structures that comprise the polymer chain, or back bone, architecture of the carboxylic acid functional polymer (a). Subscripts t and u of general polymer chain structures I and II represent average numbers of residues occurring in the $M^1$ and A blocks of residues respectively. Subscript v represents the number of segments of $M^1$ and A blocks, i.e., v-segments. Subscripts t and u may each be the same or different for each v-segment.

Similarly, general polymer chain structures III and IV together or separately represent one or more structures that comprise the polymer chain, or back bone, architecture of the epoxy functional polymer (b). Subscripts p and q of general polymer chain structures III and IV represent average numbers of residues occurring in the M and G blocks of residues respectively. Subscript x represents the number of segments of M and G blocks, i.e., x-segments. Subscripts p and q may each be the same or different for each x-segment.

For the purpose of illustrating the various polymer architectures that are represented by the above general polymer chain structures, the following are presented with specific reference to general polymer chain structures III and IV.

Homoblock polymer architecture:

When x is 1, p is 0 and q is 5, general polymer chain structure III represents a homoblock of 5 G residues, as more specifically depicted by the following general formula V.

—(G)—(G)—(G)—(G)—(G)— V

Diblock copolymer architecture:

When x is 1, p is 5 and q is 5, general polymer chain structure III represents a diblock of 5 M residues and 5 G residues as more specifically depicted by the following general formula VI.

—(M)—(M)—(M)—(M)—(M)—(G)—(G)—(G)—(G)—(G)— VI

Alternating copolymer architecture:

When x is greater than 1, for example, 5, and p and q are each 1 for each x-segment, polymer chain structure III represents an alternating block of M and G residues, as more specifically depicted by the following general formula VII.

—(M)—(G)—(M)—(G)—(M)—(G)—(M)—(G)—(M)—(G)— VII

Gradient copolymer architecture:

When x is greater than 1, for example, 3, and p and q are each independently within the range of, for example, 1 to 3, for each x-segment, polymer chain structure III represents a gradient block of M and G residues, as more specifically depicted by the following general formula VIII.

—(M)—(M)—(M)—(G)—(M)—(M)—(G)—(G)—(M)—(G)—(G)—(G)— VIII

Gradient copolymers can be prepared from two or more monomers by ATRP methods, and are generally described as having architecture that changes gradually and in a systematic and predictable manner along the polymer backbone. Gradient copolymers can be prepared by ATRP methods by (a) varying the ratio of monomers fed to the reaction medium during the course of the polymerization, (b) using a monomer feed containing monomers having different rates of polymerization, or (c) a combination of (a) and (b). Gradient copolymers are described in further detail on pages 72 through 78 of international patent publication WO 97/18247.

With further reference to general polymer chain structures III and IV, M represents one or more types of residues that are free of oxirane functionality, and p represents the average total number of M residues occurring per block of M residues (M-block) within an x-segment. The $—(M)_p—$ portion of general structures I and II represents (1) a homoblock of a single type of M residue, (2) an alternating block of two types of M residues, (3) a polyblock of two or more types of M residues, or (4) a gradient block of two or more types of M residues.

For purposes of illustration, when the M-block is prepared from, for example, 10 moles of methyl methacrylate, the $—(M)_p—$ portion of structures III and IV represents a homoblock of 10 residues of methyl methacrylate. In the case where the M-block is prepared from, for example, 5 moles of methyl methacrylate and 5 mole5 of butyl methacrylate, the $—(M)_p—$ portion of general structures III and IV represents, depending on the conditions of preparation, as is known to one of ordinary skill in the art: (a) a diblock of 5 residues of methyl methacrylate and 5 residues of butyl methacrylate having a total of 10 residues (i.e., p=10); (b) a diblock of 5 residues of butyl methacrylate and 5 residues of methyl methacrylate having a total of 10 residues; (c) an alternating block of methyl methacrylate and butyl methacrylate residues beginning with either a residue of methyl methacrylate or a residue of butyl methacrylate, and having a total of 10 residues; or (d) a gradient block of methyl methacrylate and butyl methacrylate residues beginning with either residues of methyl methacrylate or residues of butyl methacrylate having a total of 10 residues.

Also, with reference to general polymer chain structures III and IV, G represents one or more types of residues that have oxirane functionality, and q represents the average total number of G residues occurring per block of G residues (G-block) within an x-segment. Accordingly, the $—(G)_q—$ portions of polymer chain structures III and IV may be described in a manner similar to that of the $—(M)_p—$ portions provided above.

With reference to general polymer chain structures I and II, $M^1$ represents one or more types of residues that are free of carboxylic acid functionality, and t represents the average total number of $M^1$ residues occurring per block of $M^1$ residues ($M^1$-block) within a v-segment. The symbol A of general formulas I and II represents one or more types of residues that have carboxylic acid functionality, and u represents the average total number of A residues occurring per block of A residues (A-block) within a v-segment. The $—(M^1)_t—$ and $—(A)_u—$ portions of polymer chain structures I and II may be described generally in a manner similar to that of the $—(M)_p—$ and $—(G)_q—$ portions of polymer chain structures III and IV as provided previously herein.

Residue M of general polymer chain structures I and II and residue $M^1$ of general polymer chain structures III and IV are each independently derived from at least one ethylenically unsaturated radically polymerizable monomer. As used herein and in the claims, "ethylenically unsaturated radically polymerizable monomer" and like terms are meant to include vinyl monomers, allylic monomers, olefins and other ethylenically unsaturated monomers that are radically polymerizable.

Classes of vinyl monomers from which M and $M^1$ may each be independently derived include, but are not limited to, (meth)acrylates, vinyl aromatic monomers, vinyl halides and vinyl esters of carboxylic acids. As used herein and in the claims, by "(meth)acrylate" and like terms is meant both methacrylates and acrylates. Preferably, residues M and $M^1$ are each independently derived from at least one of alkyl (meth)acrylates having from 1 to 20 carbon atoms in the alkyl group. Specific examples of alkyl (meth)acrylates having from 1 to 20 carbon atoms in the alkyl group from which residues M and $M^1$ may be each be independently derived include, but are not limited to, methyl (meth) acrylate, ethyl (meth)acrylate, isopropyl (meth)acrylate, butyl (meth)acrylate, isobutyl (meth)acrylate, tert-butyl (meth)acrylate, 2-ethylhexyl (meth)acrylate, lauryl (meth) acrylate, isobornyl (meth)acrylate, cyclohexyl (meth) acrylate and 3,3,5-trimethylcyclohexyl (meth)acrylate.

Residues M and $M^1$ also may each be independently selected from monomers having more than one (meth) acrylate group, for example, (meth)acrylic anhydride and diethyleneglycol bis((meth)acrylate). Residues M and $M^1$ also may each be independently selected from alkyl (meth) acrylates containing radically transferable groups, which can act as branching monomers, for example, 2-(2-bromopropionoxy)ethyl acrylate.

Specific examples of vinyl aromatic monomers from which M and $M^1$ may each be independently derived include, but are not limited to, styrene, p-chloromethylstyrene, divinyl benzene, vinyl naphthalene and divinyl naphthalene. Vinyl halides from which M and $M^1$ may each be independently derived include, but are not limited to, vinyl chloride and vinylidene fluoride. Vinyl esters of carboxylic acids from which M and $M^1$ may each be independently derived include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins from which M and $M^1$ may each be independently derived include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula IX,

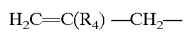

$$H_2C{=}C(R_4)—CH_2— \qquad IX$$

wherein $R_4$ is hydrogen, halogen or a $C_1$ to $C_4$ alkyl group. Most commonly, $R_4$ is hydrogen or methyl and consequently general formula IX represents the unsubstituted (meth)allyl radical. Examples of allylic monomers include, but are not limited to: (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers from which M and $M^1$ may each be independently derived include, but are not limited to: cyclic anhydrides, e.g., maleic anhydride, 1-cyclopentene-1,2-dicarboxylic anhydride and itaconic anhydride; esters of acids that are unsaturated but do not have $\alpha,\beta$-ethylenic unsaturation, e.g., methyl ester of undecylenic acid; and diesters of ethylenically unsaturated dibasic acids, e.g., diethyl maleate.

Residue A of general polymer chain structures I and II is typically derived from: alkyl (meth)acrylate, which after polymerization is hydrolyzed; or at least one hydroxy functional ethylenically unsaturated radically polymerizable monomer, which after polymerization is post-reacted with a cyclic anhydride. Examples of classes of suitable hydroxy functional ethylenically unsaturated radically polymerizable monomers from which residue A may be derived include, but are not limited to: vinyl esters such as vinyl acetate, which are hydrolyzed to residues of vinyl alcohol after polymerization; allylic esters such as allyl acetate, which are hydrolyzed to residues of allyl alcohol after polymerization; allylic functional monomer that also have hydroxy functionality, e.g., allyl alcohol and 2-allylphenol; vinyl aromatic monomers having hydroxy functionality, e.g., 2-ethenyl-5-methyl phenol, 2-ethenyl-6-methyl phenol and 4-ethenyl-3-methyl phenol; and hydroxy functional (meth) acrylates such as hydroxyalkyl (meth)acrylates, e.g., hydroxyethyl (meth)acrylate and hydroxypropyl (meth) acrylate.

The cyclic anhydride is selected from those which can react with residues of the hydroxy functional ethylenically unsaturated radically polymerizable monomers in the precursor polymer backbone, thereby attaching carboxylic acid groups thereto. Examples of suitable cyclic anhydrides include, but are not limited to, succinic anhydride, maleic anhydride, glutaric anhydride, adipic anhydride and pimelic anhydride.

In a preferred embodiment of the present invention, residue A is derived from: $C_1$–$C_4$ alkyl (meth)acrylate, e.g., t-butyl methacrylate, which after polymerization is hydrolyzed; or at least one of hydroxyethyl (meth)acrylate and hydroxypropyl (meth)acrylate, which after polymerization is post-reacted with a cyclic anhydride, e.g., succinic anhydride.

Residue A may also be derived from other monomers which can be converted or further reacted with other compounds to provide acid functionality after completion of the ATRP polymerization process. Examples of such other monomers from which residue A may be derived include, but are not limited to: acrylonitrile, the nitrile portion of which can be hydrolyzed to a carboxylic acid group after polymerization; isocyanate functional monomers, e.g., 3-isopropenyl-$\alpha,\alpha$-dimethylbenzyl isocyanate [chemical abstracts (CAS) registry number 2094-99-7], which can be reacted after polymerization with compounds containing both carboxylic acid and hydroxyl functionality, e.g., 12-hydroxystearic acid and lactic acid; and maleic anhydride, which after polymerization can be either hydrolyzed to form carboxylic acid groups or reacted with a monofunctional alcohol in the presence of acid catalyst to form ester and carboxylic acid groups.

The choice of monomers from which each of residues $M^1$ and A are selected is interrelated, i.e., the choice of monomers from which A is derived limits the choice of monomers from which $M^1$ is derived. When residue A is derived from hydroxy functional ethylenically unsaturated radically polymerizable monomer(s), which after polymerization are post-reacted with a cyclic anhydride, residue $M^1$ is typically not derived from such monomer(s). Also, when residue A is derived from one or more alkyl (meth)acrylates, which after polymerization are hydrolyzed, residue $M^1$ is typically not derived from such monomers.

Residue G of general polymer chain structures III and IV typically is derived from monomers having epoxy functionality. Preferably residue G is derived from at least one of glycidyl (meth)acrylate, 3,4-epoxycyclohexylmethyl (meth) acrylate, 2-(3,4-epoxycyclohexyl)ethyl (meth)acrylate and allyl glycidyl ether. In a particularly preferred embodiment of the present invention, residue G is derived from glycidyl methacrylate. Alternately, epoxy functionality may be incorporated into the epoxy functional polymer by post-reaction, such as by preparing a hydroxyl functional polymer and converting to an epoxy functional polymer by reacting with epichlorohydrin.

Subscripts t and u represent average number of residues occurring in a block of residues in each of general polymer chain structures I and II. Typically, t and u each independently have a value of 0 or more, preferably at least 1, and more preferably at least 5 for each of general polymer structures I and II. Also, subscripts t and u each independently have a value of typically less than 100, preferably less than 20, and more preferably less than 15 for each of general polymer structures I and II. The values of subscripts t and u may range between any combination of these values, inclusive of the recited values. Moreover, the sum of t and u is at least 1 within an v-segment and q is at least 1 within at least one v-segment in the carboxylic acid functional polymer.

Subscript v of general polymer structures I and II typically has a value of at least 1. Also, subscript v typically has a value of less than 100, preferably less than 50, and more preferably less than 10. The value of subscript v may range between any combination of these values, inclusive of the recited values. If more than one of the structures I and/or II occur in the carboxylic acid functional polymer molecule, v may have different values for each structure (as may t and u), allowing for a variety of polymer architectures such as gradient copolymers.

Subscripts p and q represent average number of residues occurring in a block of residues in each of general polymer chain structures III and IV. Typically, p and q each independently have a value of 0 or more, preferably at least 1, and more preferably at least 5 for each of general polymer structures III and IV. Also, subscripts p and q each independently have a value of typically less than 100, preferably less than 20, and more preferably less than 15 for each of general polymer structures III and IV. The values of subscripts p and q may range between any combination of these values, inclusive of the recited values. Moreover, the sum of p and q is at least 1 within an x-segment and q is at least 1 within at least one x-segment in the epoxy functional polymer.

Subscript x of general polymer structures III and IV typically has a value of at least 1. Also, subscript x typically has a value of less than 100, preferably less than 50, and more preferably less than 10. The value of subscript x may range between any combination of these values, inclusive of the recited values. If more than one of the structures III and/or IV occur in the epoxy functional polymer molecule, x may have different values for each structure (as may p and q), allowing for a variety of polymer architectures such as gradient copolymers.

The polycarboxylic acid functional polymer (a) of the present invention may be further described as having at least one of the following general polymer chain structures X and XI:

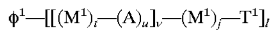

$$\phi^1\text{—}[[(M^1)_t\text{—}(A)_u]_v\text{—}(M^1)_j\text{—}T^1]_l \qquad \text{X}$$

and

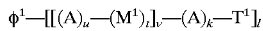

$$\phi^1\text{—}[[(A)_u\text{—}(M^1)_t]_v\text{—}(A)_k\text{—}T^1]_l \qquad \text{XI}$$

wherein t, u, v, $M^1$ and A have the same meanings as previously described herein. The subscripts j and k represent average numbers of residues occurring in the respective blocks of $M^1$ and A residues. The —$(M^1)_j$— and —$(A)_u$— portions of general formulas X and XI have meanings similar to those as previously described herein with regard to portions —$(M^1)_t$— and —$(A)_u$—.

The epoxy functional polymer (b) of the present invention may be further described as having at least one of the following general polymer chain structures XII and XIII:

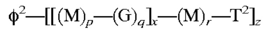

$$\phi^2\text{—}[[(M)_p\text{—}(G)_q]_x\text{—}(M)_r\text{—}T^2]_z \qquad \text{XII}$$

and

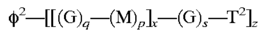

$$\phi^2\text{—}[[(G)_q\text{—}(M)_p]_x\text{—}(G)_s\text{—}T^2]_z \qquad \text{XIII}$$

wherein p, q, x, M and G have the same meanings as previously described herein. The subscripts r and s represent average numbers of residues occurring in the respective blocks of M and G residues. The —$(M)_r$— and —$(G)_s$— portions of general formulas XII and XIII have meanings similar to those as previously described herein with regard to portions —$(M)_p$— and —$(G)_q$—.

The structures X, XI, XII and XIII can represent the respective polymers themselves or, alternatively, each of the structures can comprise a terminal segment of the respective polymers. For example, where z is 1, the structures XII and XIII can represent a linear polymer, prepared by ATRP using an initiator having 1 radically transferable group. Where z is 2, the structures XII and XIII can represent a linear "leg" extending from the residue of an initiator having 2 radically transferable groups. Alternatively, where z is greater than 2, the structures XII and XIII can each represent an "arm" of a star polymer prepared by ATRP, using an initiator having more than 2 radically transferable groups. General polymer chain structures X and XI can be described similarly with regard to the associated subscript 1.

Symbols $\phi^1$ and $\phi^2$ of general formulas X, XI, XII and XIII are each independently or are each independently derived respectively from the residue of the first and second initiators used in the ATRP preparation of the respective polymers. Symbols $\phi^1$ and $\phi^2$ are further described as being the same or different, and each being free of the radically transferable group of the respective first and second initiators. For example, when the epoxy functional polymer is initiated in the presence of benzyl bromide, the symbol $\phi^2$, more specifically $\phi^2$—, is the benzyl residue,

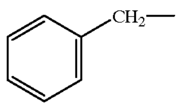

The symbols $\phi^1$ and $\phi^2$ of general formulas X, XI, XII and XIII may also each be independently derived from the residue of the respective first and second initiators. For example, when the epoxy functional polymer is initiated using epichlorohydrin the symbol $\phi^2$, more specifically $\phi^2$—, is the 2,3-epoxy-propyl residue,

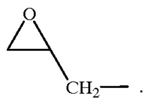

The 2,3-epoxy-propyl residue can then be converted to, for example, a 2,3-dihydroxypropyl residue.

In general formulas X and XI, subscript 1 is equal to the number of carboxylic acid functional polymer chains that are attached to $\phi^1$. In general formulas XII and XIII, subscript z is equal to the number of epoxy functional polymer chains that are attached to $\phi^2$. Subscripts 1 and z are each independently at least 1 and may have a wide range of values. In the case of comb or graft polymers, wherein $\phi^1$ and $\phi^2$ may each be macroinitiators having several pendent radically transferable groups, 1 and z can each independently have a value in excess of 10, for example 50, 100 or 1000. Typically, 1 and z are each independently less than 10, preferably less than 6 and more preferably less than 5. In a preferred embodiment of the present invention, 1 and z are each independently 1 or 2.

Symbols $T^1$ and $T^2$ of general formulas X, XI, XII and XII are each independently or are each independently derived from the radically transferable group of the respective first and second initiators. For example, when the epoxy functional polymer is prepared in the presence of diethyl-2-bromo-2-methyl malonate, $T^2$ may be the radically transferable bromo group.

The radically transferable groups of the first and second initiators may optionally be (a) removed or (b) chemically converted to another moiety. In either of (a) or (b), the symbols $T^1$ and $T^2$ are each considered herein to be derived-from the radically transferable group of the respective first and second initiators. The radically transferable group may be removed by substitution with a nucleophilic compound, e.g., an alkali metal alkoxylate. However, in the present invention, it is desirable that the method by which the radically transferable group is either removed or chemically converted also be relatively mild with regard to the epoxy functionality of the polymer.

In a preferred embodiment of the present invention, when the radically transferable group is a halogen (correspondingly $T^1$ and $T^2$ are each independently halide) the halogen can be removed by means of a mild dehalogenation reaction. The reaction is typically performed as a post-reaction after the polymer has been formed, and in the presence of at least an ATRP catalyst. Preferably, the dehalogenation post-reaction is performed in the presence of both an ATRP catalyst and its associated ligand. In the case of the polycarboxylic acid functional polymer, the dehalogenation post-reaction is further preferably performed with the precursor polymer, prior to its conversion to the carboxylic acid functional polymer.

The mild dehalogenation reaction is performed by contacting the halogen terminated polymers of the present invention with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound). As used herein, by "halogen terminated" and similar terms is meant to be inclusive also of pendent halogens, e.g., as would be present in branched, comb and star polymers.

Not intending to be bound by any theory, it is believed, based on the evidence at hand, that the reaction between the halogen terminated polymer and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of terminal halogen present in the polymer. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating each of the carboxylic functional polymer and epoxy functional polymer of the composition of the present invention under mild conditions include those represented by the following general formula XIV.

XIV

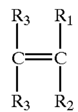

In general formula XIV, $R_1$ and $R_2$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_1$ and $R_2$ groups is an organo group while the other can be an organo group or hydrogen. For instance when one of $R_1$ or $R_2$ is an alkyl group, the other can be an alkyl, aryl, acyloxy, alkoxy, arenes, sulfur-containing alkyl group, or nitrogen-containing alkyl and/or nitrogen-containing aryl groups. The $R_3$ groups can be the same or different groups selected from hydrogen or lower alkyl selected such that the reaction between the terminal halogen of the polymer and the LRPEU compound is not prevented. Also an $R_3$ group can be joined to the $R_1$ and/or the $R_2$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between a halogen terminated polymer and LRPEU compound, e.g., alpha-methyl styrene, is summarized in the following general scheme 1.

General Scheme 1

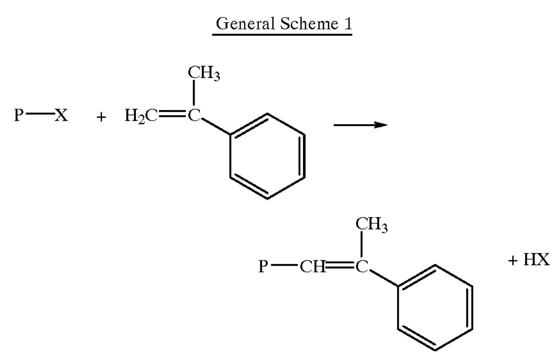

In general scheme 1, P-X represents the halogen terminated polymer.

For each of general polymer structures X and XI, the subscripts j and k each independently have a value of 0 or more. Subscripts j and k each independently have a value of typically less than 100, preferably less than 50, and more preferably less than 10, for each of general polymer structures X and XI. The values of j and k may each range between any combination of these values, inclusive of the recited values.

For each of general polymer structures XII and XIII, the subscripts r and s each independently have a value of 0 or more. Subscripts r and s each independently have a value of typically less than 100, preferably less than 50, and more preferably less than 10, for each of general polymer structures XII and XIII. The values of r and s may each range between any combination of these values, inclusive of the recited values.

The polycarboxylic acid functional polymer (a) typically has a carboxylic acid equivalent weight of at least 100 grams/equivalent, and preferably at least 200 grams/equivalent. The carboxylic acid equivalent weight of the polymer is also typically less than 10,000 grams/equivalent, preferably less than 5,000 grams/equivalent, and more preferably less than 1,000 grams/equivalent. The carboxylic acid equivalent weight of the polycarboxylic acid functional polymer may range between any combination of these values, inclusive of the recited values.

The number average molecular weight (Mn) of the polycarboxylic acid functional polymer is typically at least 250, more typically at least 500, preferably at least 1000, and more preferably at least 2000. The carboxylic acid functional polymer also typically has a Mn of less than 16,000, preferably less than 10,000, and more preferably less than 5,000. The Mn of the carboxylic acid functional polymer may range between any combination of these values, inclusive of the recited values.

The epoxy functional polymer (b) typically has an epoxy equivalent weight of at least 100 grams/equivalent, and preferably at least 200 grams/equivalent. The epoxy equivalent weight of the polymer is also typically less than 10,000 grams/equivalent, preferably less than 5,000 grams/equivalent, and more preferably less than 1,000 grams/ equivalent. The epoxy equivalent weight of the epoxy functional polymer may range between any combination of these values, inclusive of the recited values.

The number average molecular weight (Mn) of the epoxy functional polymer is typically at least 250, more typically at least 500, preferably at least 1000, and more preferably at least 2000. The epoxy functional polymer also typically has a Mn of less than 16,000, preferably less than 10,000, and more preferably less than 5,000. The Mn of the epoxy functional polymer may range between any combination of these values, inclusive of the recited values.

The polycarboxylic acid functional polymer and the epoxy functional polymer may each be used in the thermosetting composition of the present invention as resinous binders or as additives with separate resinous binders, which may be prepared by ATRP or by conventional polymerization methods. When used as additives, the polycarboxylic acid functional polymer and the epoxy functional polymer as described herein each typically have low functionality, e.g., they may each be monofunctional, and a correspondingly high equivalent weight.

The polycarboxylic acid functional polymer (a) is typically present in the thermosetting composition of the present invention in an amount of at least 0.5 percent by weight, more typically at least 5 percent by weight, preferably at least 30 percent by weight, and more preferably at least 40 percent by weight, based on total weight of resin solids of the thermosetting composition. The thermosetting composition also typically contains polycarboxylic acid functional polymer present in an amount of less than 99.5 percent by weight, more typically less than 95 percent by weight, preferably less than 70 percent by weight, and more preferably less than 50 percent by weight, based on total-weight of resin solids of the thermosetting composition. The polycarboxylic acid functional polymer may be present in the thermosetting composition of the present invention in an amount ranging between any combination of these values, inclusive of the recited values.

The epoxy functional polymer (b) is typically present in the thermosetting composition of the present invention in an amount of at least 0.5 percent by weight, more typically at least 5 percent by weight, preferably at least 30 percent by weight, and more preferably at least 40 percent by weight, based on total weight of resin solids of the thermosetting composition. The thermosetting composition also typically contains epoxy functional polymer present in an amount of less than 99.5 percent by weight, more typically less than 95 percent by weight, preferably less than 70 by weight, and more preferably less than 50 percent by weight, based on total weight of resin solids of the thermosetting composition. The epoxy functional polymer may be present in the thermosetting composition of the present invention in an amount ranging between any combination of these values, inclusive of the recited values.

The thermosetting composition of the present invention may optionally further comprise a second polycarboxylic acid functional material. Classes of optional second polycarboxylic acid functional materials include, but are not limited to, $C_4$ to $C_{20}$ aliphatic dicarboxylic acids, polymeric polyanhydrides, polyesters, polyurethanes and mixtures thereof. The second polycarboxylic acid functional material is preferably crystalline. These optional second polycarboxylic acid functional materials can provide for improved flexibility, impact resistance and less yellowing in polymerizates, e.g., cured coatings, obtained from the thermosetting composition. These optional carboxylic acid functional materials also assist in flow during cure thereby providing for smooth glossy polymerizates, e.g., glossy coatings.

The amount of optional second polycarboxylic acid functional material present in the composition of the present invention will depend on whether it is crystalline or amorphous. If crystalline, the second polycarboxylic acid functional material may optionally be present in the composition in an amount of from 1 to 25 percent by weight, preferably from 5 to 20 percent by weight, based on the total weight of resin solids. If amorphous, the second polycarboxylic acid functional material may optionally be present in the composition in an amount of from 1 to 40 percent by weight, preferably from 15 to 35 percent by weight, based on the total weight of resin solids.

Aliphatic dicarboxylic acids which may optionally be present in the thermosetting composition include, but are not limited to, dodecanedioic acid, azelaic acid, adipic acid, 1,6-hexanedioic acid, succinic acid, pimelic acid, sebasic acid, maleic acid, itaconic acid, aconitic acid and mixtures thereof. Preferably, the aliphatic dicarboxylic acid contains from 6 to 12 carbon atoms and is a crystalline solid at room temperature. In an embodiment of the present invention, dodecanedioic acid is preferred.

Other suitable second polycarboxylic acid functional materials useful in the present invention include those represented by the following general formula XV,

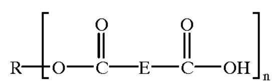

XV

In general formula XV, R is the residue of a polyol, E is a divalent linking group having from 1 to 10 carbon atoms, and n is an integer of from 2 to 10. Examples of polyols from which R of general formula XV may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which E may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid- 1,2-phenylene. The divalent linking group E is preferably aliphatic.

The second polycarboxylic acid functional material represented by general formula XV is typically prepared from a polyol and a dibasic acid or cyclic anhydride. For example, trimethylol propane and hexahydro-4-methylphthalic anhydride are reacted together in a molar ratio of 1:3 respectively, to form a carboxylic acid functional crosslinking agent. This particular second polycarboxylic acid functional material can be described with reference to general formula XV as follows, R is the residue of trimethylol propane, E is the divalent linking group 4-methyl-1,2-cyclohexylene, and n is 3. Second polycarboxylic acid functional materials described herein with reference to general formula XV are meant to include also any unreacted starting materials and/or co-products, e.g., oligomeric species, resulting from their preparation and contained therein.

Carboxylic acid functional polymeric polyanhydrides that may be used in the present invention include those having number average molecular weights in the range of 400 to 2500, and preferably 600 to 1200. Number average molecular weights greater than 2500 are generally undesirable because of a tendency to cause poor physical stability, e.g., sintering of individual particulates, of the thermosetting composition. Examples of suitable polymeric anhydrides include, but are not limited to, poly(adipic anhydride), poly(azelaic anhydride), poly(sebacic, anhydride), poly (dodecanedioic anhydride) and mixed acid anhydrides. Polymeric polyanhydrides can be prepared by art recognized methods, for example as described in U.S. Pat. No. 4,937, 288 at column 5, lines 3 through 8, the disclosure of which is incorporated herein by reference.

Carboxylic acid functional polyesters that may be used in the present invention include both crystalline and amorphous polyesters. Preferred crystalline carboxylic acid functional polyesters generally have a carboxylic acid equivalent weight of from 150 to 750, and a number average molecular weight of from 300 to 1500. Useful carboxylic acid functional polyesters include those prepared from the condensation of aliphatic diols, and aliphatic and/or aromatic polycarboxylic acids, preferably dicarboxylic acids. The preparation of crystalline and amorphous carboxylic acid functional polyesters is described in further detail in U.S. Pat. No. 4,937,288 at column 5 line 9 through column 6 line 12, the disclosure of which is incorporated herein by reference.

Polycarboxylic acid functional polyurethanes that may be used in the compositions of the present invention can serve to improve the exterior durability of polymerizates obtained therefrom. Carboxylic acid functional polyurethanes can be prepared by art recognized methods, which typically involve a two step process. In the first step a hydroxy functional polyurethane is prepared from polyols and polyisocyanates. In the second step, the hydroxy functional polyurethane is further reacted with a diacid or preferably a cyclic anhydride to form the polycarboxylic acid functional polyurethane. Polycarboxylic acid functional polyurethanes useful in the present invention are described in further detail in U.S. Pat. No. 4,937,288, at column 6, lines 13 through 39, the disclosure of which is incorporated herein by reference.

The equivalent ratio of carboxylic acid equivalents in the polycarboxylic acid functional polymer (a) to epoxy equivalents in the epoxy functional polymer (b) is typically from 0.5:1 to 1.5:1, and preferably from 0.8:1 to 1.2:1. While equivalent ratios outside of this range are within the scope of the present invention, they are generally less desirable due to appearance and performance deficiencies in cured films obtained therefrom. The above recited ranges of ratios are meant to also be inclusive of the carboxylic acid equivalents associated with any second polycarboxylic acid functional material(s) that may optionally be present in the composition.

The thermosetting composition of the present invention usually also includes one or more cure catalysts for catalyzing the reaction between the carboxylic acid groups of the polycarboxylic acid functional polymer and the epoxy groups of the epoxy functional polymer. Examples of useful cure catalysts include the tertiary amines, e.g., methyl dicocoamine, and tin compounds, e.g., triphenyl tin hydroxide. Curing catalyst is typically present in the thermosetting composition in an amount of less than 5 percent by weight, e.g., from 0.25 percent by weight to 2.0 percent by weight, based on total resin solids weight of the composition.

The thermosetting composition of the present invention may also include pigments and fillers. Examples of pigments include, but are not limited to, inorganic pigments, e.g., titanium dioxide and iron oxides, organic pigments, e.g., phthalocyanines, anthraquinones, quinacridones and thioindigos, and carbon blacks. Examples of fillers include, but are not limited to, silica, e.g., precipitated silicas, clay, and barium sulfate. When used in the composition of the present invention, pigments and fillers are typically present in amounts of from 0.1 percent to 70 percent by weight, based on total weight of the thermosetting composition. More often, the thermosetting composition of the present invention is used as a clear composition being substantially free of pigments and fillers.

The thermosetting composition of the present invention may optionally contain additives such as waxes for flow and wetting, flow control agents, e.g., poly(2-ethylhexyl) acrylate, degassing additives such as benzoin, adjuvant resin to modify and optimize coating properties, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of the thermosetting composition.

The thermosetting composition of the present invention is typically prepared by first dry blending the carboxylic acid functional polymer, epoxy functional polymer, and additives, such as flow control agents, degassing agents and catalysts, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range of 80° C. to 140° C., e.g., from 100° C. to 125° C..

Optionally, the thermosetting composition may be melt blended in two or more steps. For example, a first melt blend is prepared in the absence of cure catalyst. A second melt blend is prepared at a lower temperature, from a dry blend of the first melt blend and the cure catalyst. When used as a powder coating composition, the melt blended thermosetting composition is typically milled to an average particle size of from, for example, 15 to 30 microns.

In accordance with the present invention there is also provided, a method of coating a substrate comprising:

(a) applying to said substrate a thermosetting composition;

(b) coalescing said thermosetting composition to form a substantially continuous film; and (c) curing said thermosetting composition by the application of heat, wherein said thermosetting composition comprises a co-reactable solid, particulate mixture as previously described herein.

The thermosetting composition of the present invention may be applied to the substrate by any appropriate means that are known to those of ordinary skill in the art. Generally, the thermosetting composition is in the form of a dry powder and is applied by spray application. Alternatively, the powder can be slurried in a liquid medium such as water, and spray applied. Where the language "co-reactable solid, particulate mixture" is used in the specification and claims, the thermosetting composition can be in dry powder form or in the form of a slurry.

When the substrate is electrically conductive, the thermosetting composition is typically electrostatically applied. Electrostatic spray application generally involves drawing the thermosetting composition from a fluidized bed and propelling it through a corona field. The particles of the thermosetting composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited composition to a maximum of 3 to 6 mils (75 to 150 microns).

Alternatively, when the substrate is not electrically conductive, for example as is the case with many plastic substrates, the substrate is typically preheated prior to application of the thermosetting composition. The preheated temperature of the substrate is equal to or greater than that of the melting point of the thermosetting composition, but less than its cure temperature. With spray application over preheated substrates, film builds of the thermosetting composition in excess of 6 mils (150 microns) can be achieved, e.g., 10 to 20 mils (254 to 508 microns). Substrates that may be coated by the method of the present invention include, for example, ferrous substrates, aluminum substrates, plastic substrates, e.g., sheet molding compound based plastics, and wood.

After application to the substrate, the thermosetting composition is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three dimensional crosslink network formed by covalent bond formation, e.g., between the carboxylic acid groups of the carboxylic acid functional polymer and the epoxy groups of the epoxy functional polymer. The temperature at which the thermosetting composition of the present invention cures is variable and depends in part on the type and amount of catalyst used. Typically, the thermosetting composition has a cure temperature within the range of 130° C. to 160° C., e.g., from 140° C. to 150° C.

In accordance with the present invention there is further provided, a multi-component composite coating composition comprising:

(a) a base coat deposited from a pigmented film-forming composition; and (b) a transparent top coat applied over said base coat, wherein said transparent top coat is deposited from a clear film-forming thermosetting composition comprising a co-reactable solid, particulate mixture as previously described herein. The multi-component composite coating composition as described herein is commonly referred to as a color-plus-clear coating composition.

The pigmented film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, and polyurethanes.

The resinous binders for the pigmented film-forming base coat composition can be organic solvent-based materials such as those described in U.S. Pat. No. 4,220,679, note column 2 line 24 through column 4, line 40. Also, water-based coating compositions such as those described in U.S. Pat. Nos. 4,403,003, 4,147,679 and 5,071,904 can be used as the binder in the pigmented film-forming composition.

The pigmented film-forming base coat composition is colored and may also contain metallic pigments. Examples of suitable pigments can be found in U.S. Pat. Nos. 4,220,679, 4,403,003, 4,147,679 and 5,071,904.

Ingredients that may be optionally present in the pigmented film-forming base coat composition are those which are well known in the art of formulating surface coatings and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147,769 and 5,071,904.

The pigmented film-forming base coat composition can be applied to the substrate by any of the conventional coating techniques such as brushing, spraying, dipping or flowing, but are most often applied by spraying. The usual spray techniques and equipment for air spraying, airless spray and electrostatic spraying employing either manual or automatic methods can be used. The pigmented film-forming composition is applied in an amount sufficient to provide a base coat having a film thickness typically of 0.1 to 5 mils (2.5 to 125 microns) and preferably 0.1 to 2 mils (2.5 to 50 microns).

After deposition of the pigmented film-forming base coat composition on to the substrate, and prior to application of the transparent top coat, the base coat can be cured or alternatively dried. In drying the deposited base coat, organic solvent and/or water, is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The transparent top coat is applied over the deposited base coat by any of the methods by which powder coatings are known to be applied. Preferably the transparent top coat is applied by electrostatic spray application, as described previously herein. When the transparent top coat is applied over a deposited base coat that has been dried, the two coatings can be co-cured to form the multi-component composite coating composition of the present invention. Both the base coat and top coat are heated together to conjointly cure the two layers. Typically, curing conditions of 130° C. to 160° C. for a period of 20 to 30 minutes are employed. The transparent top coat typically has a thickness within the range of 0.5 to 6 mils (13 to 150 microns), e.g., from 1 to 3 mils (25 to 75 microns).

The present invention is more particularly described in the following examples, which are intended to be illustrative only, since numerous modifications and variations therein will be apparent to those skilled in the art. Unless otherwise specified, all parts and percentages are by weight.

Synthesis Examples A–C

Synthesis Examples A–C describe the preparation of carboxylic acid functional and epoxide functional acrylic polymers that are used in the powder coating compositions of Examples 1 and 2. The carboxylic acid functional polymer of Example A is a comparative polymer prepared by non-living radical polymerization. The carboxylic acid functional and epoxide functional polymers of Examples B and C are representative of polymers useful in the thermosetting coating compositions of the present invention. The physical properties of the polymers of Examples A–C are summarized in Table 1.

In synthesis Examples A–C, the following monomer abbreviations are used: methyl methacrylate (MMA);

n-butyl methacrylate (n-BMA); tertiary-butyl methacrylate (t-BMA); methacrylic acid (MAA); glycidyl methacrylate (GMA); and iso-butyl methacrylate (i-BMA).

Example A

A comparative carboxylic acid functional polymer was prepared by conventional, i.e., non-controlled or non-living, radical polymerization from the ingredients enumerated in Table A.

TABLE A

| Ingredients | Parts by weight |
|---|---|
| Charge 1 | |
| toluene | 350 |
| initiator (a) | 40 |
| Charge 2 | |
| MMA | 100 |
| n-BMA | 350 |
| MAA | 50 |

(a) 2,2'-azobis(2-methylbutanenitrile) initiator, obtained commercially from E. I. du Pont de Nemours and Company.

Charge 1 was heated to reflux temperature (at about 115° C.) at atmospheric pressure under a nitrogen blanket in a 2 liter round bottom flask equipped with a rotary blade agitator, reflux condenser, thermometer and heating mantle coupled together in a feed-back loop through a temperature controller, nitrogen inlet port, and two addition ports. After holding Charge 1 for 30 minutes at reflux, Charge 2 was added over a period of 1 hour. With the completion of the addition of Charge 2, the contents of the flask were held at reflux for an additional 3 hours. The contents of the flask were then vacuum stripped. While still molten, the stripped contents of the flask were transferred to a suitable shallow open container and allowed to cool to room temperature and harden. The solidified resin was then broken into smaller pieces, which were transferred to a suitable closed container for storage.

Example B

A carboxylic acid functional polymer useful in the thermosetting compositions of the present invention was prepared by atom transfer radical polymerization from the ingredients listed in Table B.

TABLE B

| Ingredients | Parts by weight |
|---|---|
| toluene | 350 |
| copper(II) bromide (b) | 2.0 |
| copper powder (c) | 2.2 |
| 2,2'-bypyridyl | 7.4 |
| diethyl-2-bromo-2-methylmalonate | 50.6 |
| MMA | 100 |
| n-BMA | 350 |
| t-BMA | 83 |

(b) The copper(II) bromide was in the form of flakes and was obtained from Aldrich Chemical Company.
(c) The copper powder had an average particle size of 25 microns, a density of 1 gram/cm$^3$, and was obtained commercially from OMG Americas.

The ingredients were all added to a 2 liter 4-necked flask equipped with a motor driven stainless steel stir blade, water cooled condenser, and a heating mantle and thermometer connected through a temperature feed-back control device. The contents of the flask were heated to and held at 85° C. for 4 hours. The contents of the flask were then cooled, filtered and the solvent was removed by means of vacuum stripping. To the stripped resin was added 350 ml of dioxane, and a 3 times molar excess (relative to the moles of t-BMA) of HCl (1 Molar in water). The resin, dioxane, HCl and water mixture was refluxed in a suitable round bottom flask for 4 hours. The contents of the flask were then cooled to room temperature and the pH was neutralized by the addition of sodium carbonate. The neutralized contents of the flask were filtered, and the water and dioxane were removed by vacuum distillation in a suitable flask. While still molten, the stripped contents of the flask were transferred to a suitable shallow open container and allowed to cool to room temperature and harden. The solidified resin was then broken into smaller pieces, which were transferred to a suitable closed container for storage.

Example C

An epoxy functional tetrablock copolymer useful in the thermosetting compositions of the present invention was prepared by atom transfer radical polymerization from the ingredients listed in Table C. The epoxy functional block copolymer of this example is summarized diagrammatically as follows:

(GMA)—(i-BMA)—(GMA)—(n-BMA)

TABLE C

| Ingredients | Parts by weight |
|---|---|
| Charge 1 | |
| toluene | 500.7 |
| copper(II) bromide (b) | 10.9 |
| copper powder (c) | 15.25 |
| 2,2'-bypyridyl | 26.24 |
| p-toluenesulfonyl chloride | 288.8 |
| GMA | 511.2 |
| Charge 2 | |
| toluene | 245.7 |
| i-BMA | 682.6 |
| Charge 3 | |
| toluene | 329.1 |
| GMA | 511.2 |
| Charge 4 | |
| toluene | 245.7 |
| n-BMA | 511.2 |

Charge 1 was heated to and held at 85° C. for one hour in a 5 liter 4-necked flask equipped as described in Example B. While maintaining the contents of the flask at 85° C., Charge 2 was added over a period of 15 minutes, followed by a 2 hour hold at 85° C. Charge 3 was then added over a period of 15 minutes, followed by a 2 hour hold at 85° C. Charge 4 was added over a period of 15 minutes at a flask content temperature of 85° C., followed by a 2 hour hold at 85° C. The contents of the flask were cooled, filtered and stripped of solvent by means of vacuum distillation. While still molten, the stripped resin was transferred to a suitable shallow open container and allowed to cool to room temperature and harden. The solidified resin was then broken into smaller pieces, which were transferred to a suitable closed container for storage.

TABLE 1

| Physical Data of the Polymers of Synthesis Examples A–C | Example A | Example B | Example C |
|---|---|---|---|
| Mn (d) | 3100 | 2480 | 1800 |
| Mw (d) | 6045 | 3550 | 2250 |
| PDI (e) | 1.95 | 1.25 | 1.25 |
| Tg onset (° C.) (f) | 28.3 | 39.9 | 31.0 |
| Tg midpoint (° C.) (f) | 45.4 | 54.8 | 38.3 |
| Tg endpoint (° C.) (f) | 62.3 | 69.6 | 46.4 |
| Melt Viscosity at 165° C. (poise) (g) | N.D.[1] | N.D.[1] | 32 |
| Melt Viscosity at 180° C. (poise) (g) | 572 | 112 | N.D.[1] |
| Acid Equivalent Weight (h) | 896 | 925 | N.A.[2] |
| Epoxy Equivalent Weight (i) | N.A.[2] | N.A.[2] | 351 |
| Percent Weight Solids (j) | 99.8 | 99.9 | 99.5 |

[1]N.D. = Not Determined.
[2]N.A. = Not applicable.
(d) The molecular weight data was obtained by means of gel permeation chromatography using polystyrene standards. The abbreviations are summarized as follows: number average molecular weight (Mn); and weight average molecular weight (Mw).
(e) Polydispersity index (PDI) = (Mw/Mn).
(f) Glass transition temperature (Tg) onset, midpoint and endpoint values were determined by means of differential scanning calorimetry (DSC). The polymer samples underwent a stress release cycle followed by heating at a rate of 10° C./minute.
(g) Melt viscosities at 165° C. and 180° C. were determined using a Brookfield CAP 2000 High Temperature Viscometer.
(h) Acid equivalent weight was determined by titration with potassium hydroxide, and is shown in units of grams of polymer / equivalent of acid.
(i) Epoxy equivalent weight (grams of polymer/epoxy equivalent) was determined by titration of the polymer sample with a 0.1 Normal perchloric acid solution.
(j) Percent weight solids, based on total weight was determined from 0.2 gram samples at 110° C. / 1 hour.

Powder Coating Composition Examples 1 and 2

Powder coating Example 2 is representative of a thermosetting coating composition according to the present invention, while powder coating Example 1 is a thermosetting coating composition comprising carboxylic acid functional and epoxy functional resins prepared by conventional non-living radical polymerization methods. The powder coating compositions were prepared from the ingredients enumerated in Table 2.

TABLE 2

Powder Coating Compositions

| Ingredient | Example 1 | Example 2 |
|---|---|---|
| Polymer of Example A | 7 | 0 |
| PD9060 epoxy acrylic resin (k) | 2.7 | 0 |
| Polymer of Example B | 0 | 7 |
| Polymer of Example C | 0 | 2.7 |
| Flow Control Agent (1) | 0.3 | 0.3 |
| Benzoin | 0.1 | 0.1 |

(k) PD9060 resin is a solid epoxy functional acrylic resin prepared by conventional non-living radical polymerization of acrylic monomers. It is commercially available from Anderson Development Co., and was determined to have an epoxy equivalent weight of 375 grams of polymer / epoxy equivalent.
(1) TROY 570 flow control agent, commercially available from Troy Corporation.

The ingredients listed in Table 2 were melt mixed by hand using a spatula on a hot plate at a temperature of 175° C. (347° F.). The melt-mixed compositions were then coarsely ground by hand using a mortar and pestle. The course particulate thermosetting coating compositions of Examples 1 and 2 were found to have 175° C. (347° F.) melt viscosities of 35 poise and 17 poise respectively. The melt viscosities were determined using a temperature controlled cone and plate viscometer manufactured by Research Equipment (London) Ltd.

The present invention has been described with reference to specific details of particular embodiments thereof. It is not intended that such details be regarded as limitations upon the scope of the invention except insofar as and to the extent that they are included in the accompanying claims.

We claim:

1. A thermosetting composition comprising a co-reactable solid, particulate mixture of:

(a) polycarboxylic acid functional polymer prepared by atom transfer radical polymerization initiated in the presence of a first initiator having at least one radically transferable group, and in which said polycarboxylic acid functional polymer contains at least one of the following polymer chain structures:

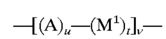

$$-[(M^1)_t-(A)_u]_v-$$

and $$-[(A)_u-(M^1)_t]_v-$$

wherein $M^1$ is a residue, that is free of carboxylic acid functionality, of at least one ethylenically unsaturated radically polymerizable monomer; A is a residue, that has carboxylic acid functionality, of at least one ethylenically unsaturated radically polymerizable monomer; t and u represent average numbers of residues occurring in a block of residues in each polymer chain structure; and t, u and v are each independently selected for each structure such that said polycarboxylic acid functional polymer has a number average molecular weight of at least 250; and (b) epoxy functional polymer prepared by atom transfer radical polymerization initiated in the presence of a second initiator having at least one radically transferable group, and in which said epoxy functional polymer contains at least one of the following polymer chain structures:

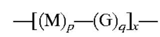

$$-[(M)_p-(G)_q]_x-$$

and

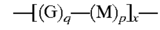

$$-[(G)_q-(M)_p]_x-$$

wherein M is a residue, that is free of oxirane functionality, of at least one ethylenically unsaturated radically polymerizable monomer; G is a residue, that has oxirane functionality, of at least one ethylenically unsaturated radically polymerizable monomer; p and q represent average numbers of residues occurring in a block of residues in each polymer chain structure; and p, q and x are each independently selected for each structure such that said epoxy functional polymer has a number average molecular weight of at least 250.

2. The composition of claim 1 wherein said polycarboxylic acid functional polymer (a) and said epoxy functional polymer (b) are each independently selected from the group consisting of linear polymers, branched polymers, hyperbranched polymers, star polymers, graft polymers and mixtures thereof.

3. The composition of claim 1 wherein said polycarboxylic acid functional polymer (a) and said epoxy functional polymer (b) each independently have a number average molecular weight of from 500 to 16,000, and a polydispersity index of less than 2.0.

4. The composition of claim 1 wherein said first and second initiators are each independently selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

5. The composition of claim 4 wherein said first and second initiators are each independently selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis ($\alpha$-halo-$C_1$–$C_6$-alkyl) benzene, diethyl-2-halo-2-methyl malonate, ethyl 2-bromoisobutyrate and mixtures thereof.

6. The composition of claim 1 wherein said polycarboxylic acid functional polymer (a) has a carboxylic acid equivalent weight of from 100 to 10,000 grams/equivalent, and said epoxy functional polymer (b) has an epoxy equivalent weight of from 100 to 10,000 grams/equivalent.

7. The composition of claim 1 wherein $M^1$ and M are each independently derived from at least one of vinyl monomers, allylic monomers and olefins.

8. The composition of claim 7 wherein $M^1$ and M are each independently derived from at least one of alkyl (meth) acrylates having from 1 to 20 carbon atoms in the alkyl group, vinyl aromatic monomers, vinyl halides, vinyl esters of carboxylic acids and olefins.

9. The composition of claim 1 wherein A is derived from: alkyl (meth)acrylate, which after polymerization is hydrolyzed; or at least one hydroxy functional ethylenically unsaturated radically polymerizable monomer, which after polymerization is post-reacted with a cyclic anhydride.

10. The composition of claim 1 wherein G is derived from at least one of glycidyl (meth)acrylate, 3,4-epoxycyclohexylmethyl(meth)acrylate, 2—(3,4-epoxycyclohexyl)ethyl(meth)acrylate and allyl glycidyl ether.

11. The composition of claim 1 wherein said polycarboxylic acid functional polymer (a) has at least one of the following polymer chain structures:

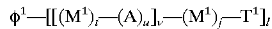

$$\phi^1\text{—}[[(M^1)_t\text{—}(A)_u]_v\text{—}(M^1)_j\text{—}T^1]_l$$

and

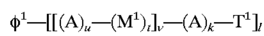

$$\phi^1\text{—}[[(A)_u\text{—}(M^1)_t]_v\text{—}(A)_k\text{—}T^1]_l$$

wherein $\phi^1$ is or is derived from the residue of said first initiator free of said radically transferable group; $T^1$ is or is derived from said radically transferable group of said first initiator; v is independently from 1 to 100 for each structure; t and u are each independently within the range of 0 to 100 for each v-segment and for each structure, the sum of t and u being at least 1 for each v-segment, and u being at least 1 for at least one v-segment; j and k are each independently for each structure within the range of 0 to 100; l is independently for each structure at least 1; and said polycarboxylic acid functional polymer has a polydispersity index of less than 2.0; and said epoxy functional polymer (b) has at least one of the following polymer chain structures:

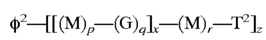

$$\phi^2\text{—}[[(M)_p\text{—}(G)_q]_x\text{—}(M)_r\text{—}T^2]_z$$

and

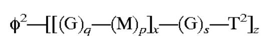

$$\phi^2\text{—}[[(G)_q\text{—}(M)_p]_x\text{—}(G)_s\text{—}T^2]_z$$

wherein $\phi^2$ is or is derived from the residue of said second initiator free of said radically transferable group; $T^2$ is or is derived from said radically transferable group of said second initiator; x is independently from 1 to 100 for each structure; p and q are each independently within the range of 0 to 100 for each x-segment and for each structure, the sum of p and q being at least 1 for each x-segment, and q being at least 1 for at least one x-segment; r and s are each independently for each structure within the range of 0 to 100; z is independently for each structure at least 1; and said epoxy functional polymer has a polydispersity index of less than 2.0.

12. The composition of claim 11 wherein said polycarboxylic acid functional polymer (a) has a carboxylic acid equivalent weight of from 100 to 10,000 grams/equivalent, said epoxy functional polymer (b) has an epoxy equivalent weight of from 100 to 10,000 grams/equivalent, and said polycarboxylic acid functional polymer and said epoxy functional polymer each independently have a polydispersity index of less than 1.8.

13. The composition of claim 11 wherein t is independently selected for each structure within the range of 1 to 20; u is independently selected for each structure within in the range of 1 to 20; p is independently selected for each structure within the range of 1 to 20; and q is independently selected for each structure within in the range of 1 to 20.

14. The composition of claim 11 wherein v is independently selected for each structure within the range of 1 to 50; and x is independently selected for each structure within the range of 1 to 50.

15. The composition of claim 11 wherein $T^1$ and $T^2$ are each independently halide.

16. The composition of claim 15 wherein $T^1$ and $T^2$ are each independently derived from a dehalogenation post-reaction.

17. The composition of claim 16 wherein said dehalogenation post-reaction comprises contacting independently each of said polycarboxylic acid functional polymer and said epoxy functional polymer with a limited radically polymerizable ethylenically unsaturated compound.

18. The composition of claim 17 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

19. The composition of claim 11 wherein $\phi^1$ and $\phi^2$ are the same or different.

20. The composition of claim 1 wherein the equivalent ratio of carboxylic acid equivalents in said polycarboxylic acid functional polymer (a) to epoxy equivalents in said epoxy functional polymer (b) is from 0.5:1 to 1.5:1.

21. The composition of claim 1 wherein said polycarboxylic acid functional polymer (a) is present in said thermosetting composition in amounts of from 5 to 95 percent by weight, based on total resin solids weight, and said epoxy functional polymer (b) is present in said thermosetting composition in an amount of from 5 to 95 percent by weight, based on total resin solids weight.

22. The composition of claim 1 further comprising a second polycarboxylic acid functional material selected from the group consisting of: $C_4$ to $C_{20}$ dicarboxylic acids; carboxylic acid functional materials represented by the following general formula,

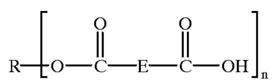

wherein R is the residue of a polyol, E is a divalent linking group having from 2 to 10 carbon atoms, and n is an integer of from 2 to 10; and mixtures thereof.

23. The composition of claim 22 wherein said dicarboxylic acid is selected from the group consisting of dodecanedioic acid, azelaic acid, adipic acid, 1,6-hexanedioic acid, succinic acid, pimelic acid, sebasic acid, maleic acid, itaconic acid, aconitic acid and mixtures thereof, said polyol from which R is derived is selected from the group consisting of ethylene glycol, di(ethylene glycol), trimethylolethane, trimethylolpropane, pentaerythritol, di-trimethylolpropane and di-pentaerythritol, E is selected from the group consisting of 1,2-cyclohexylene and 4-methyl-1,2-cyclohexylene, and n is an integer of from 2 to 6, said second polycarboxylic acid functional material being present in said thermosetting composition in an amount of from 1 percent to 25 percent by weight, based on the total weight of resin solids.

24. A method of coating a substrate comprising:

(a) applying to said substrate a thermosetting composition;

(b) coalescing said thermosetting composition to form a substantially continuous film; and (c) curing said thermosetting composition by the application of heat, wherein said thermosetting composition comprises a co-reactable solid, particulate mixture of:

(i) polycarboxylic acid functional polymer prepared by atom transfer radical polymerization initiated in the presence of a first initiator having at least one radically transferable group, and in which said polycarboxylic acid functional polymer contains at least one of the following polymer chain structures:

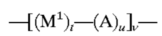

and

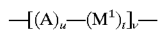

wherein $M^1$ is a residue, that is free of carboxylic acid functionality, of at least one ethylenically unsaturated radically polymerizable monomer; A is a residue, that has carboxylic acid functionality, of at least one ethylenically unsaturated radically polymerizable monomer; t and u represent average numbers of residues occurring in a block of residues in each polymer chain structure; and t, u and v are each independently selected for each structure such that said polycarboxylic acid functional polymer has a number average molecular weight of at least 250; and (ii) epoxy functional polymer prepared by atom transfer radical polymerization initiated in the presence of a second initiator having at least one radically transferable group, and in which said epoxy functional polymer contains at least one of the following polymer chain structures:

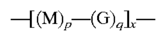

and

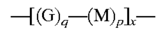

wherein M is a residue, that is free of oxirane functionality, of at least one ethylenically unsaturated radically polymerizable monomer; G is a residue, that has oxirane functionality, of at least one ethylenically unsaturated radically polymerizable monomer; p and q represent average numbers of residues occurring in a block of residues in each polymer chain structure; and p, q and x are each independently selected for each structure such that said epoxy functional polymer has a number average molecular weight of at least 250.

25. The method of claim 24 wherein said polycarboxylic acid functional polymer (i) and said epoxy functional polymer (ii) are each independently selected from the group consisting of linear polymers, branched polymers, hyperbranched polymers, star polymers, graft polymers and mixtures thereof.

26. The method of claim 24 wherein said polycarboxylic acid functional polymer (i) and said epoxy functional polymer (ii) each independently have a number average molecular weight of from 500 to 16,000, and a polydispersity index of less than 2.0.

27. The method of claim 24 wherein said first and second initiators are each independently selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

28. The method of claim 27 wherein said first and second initiators are each independently selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis($\alpha$-halo-$C_1$–$C_6$-alkyl) benzene, diethyl-2-halo-2-methyl malonate, ethyl 2-bromoisobutyrate and mixtures thereof.

29. The method of claim 24 wherein said polycarboxylic acid functional polymer (i) has a carboxylic acid equivalent weight of from 100 to 10,000 grams/equivalent, and said epoxy functional polymer (ii) has an epoxy equivalent weight of from 100 to 10,000 grams/equivalent.

30. The method of claim 24 wherein $M^1$ and M are each independently derived from at least one of vinyl monomers, allylic monomers and olefins.

31. The method of claim 30 wherein $M^1$ and M are each independently derived from at least one of alkyl (meth) acrylates having from 1 to 20 carbon atoms in the alkyl group, vinyl aromatic monomers, vinyl halides, vinyl esters of carboxylic acids and olefins.

32. The method of claim 24 wherein A is derived from: alkyl (meth)acrylate, which after polymerization is hydrolyzed; or at least one hydroxy functional ethylenically unsaturated radically polymerizable monomer, which after polymerization is post-reacted with a cyclic anhydride.

33. The method of claim 24 wherein G is derived from at least one of glycidyl (meth)acrylate, 3,4-epoxycyclohexylmethyl(meth)acrylate, 2-(3,4-epoxycyclohexyl)ethyl(meth)acrylate and allyl glycidyl ether.

34. The method of claim 24 wherein said polycarboxylic acid functional polymer (i) has at least one of the following polymer chain structures:

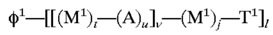

$$\phi^1\text{—}[[(M^1)_t\text{—}(A)_u]_v\text{—}(M^1)_j\text{—}T^1]_l$$

and

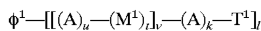

$$\phi^1\text{—}[[(A)_u\text{—}(M^1)_t]_v\text{—}(A)_k\text{—}T^1]_l$$

wherein $\phi^1$ is or is derived from the residue of said first initiator free of said radically transferable group; $T^1$ is or is derived from said radically transferable group of said first initiator; v is independently from 1 to 100 for each structure; t and u are each independently within the range of 0 to 100 for each v-segment and for each structure, the sum of t and u being at least 1 for each v-segment, and u being at least 1 for at least one v-segment; j and k are each independently for each structure within the range of 0 to 100; l is independently for each structure at least 1; and said polycarboxylic acid functional polymer has a polydispersity index of less than 2.0; and said epoxy functional polymer (ii) has at least one of the following polymer chain structures:

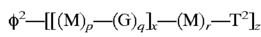

$$\phi^2\text{—}[[(M)_p\text{—}(G)_q]_x\text{—}(M)_r\text{—}T^2]_z$$

and

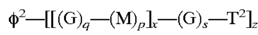

$$\phi^2\text{—}[[(G)_q\text{—}(M)_p]_x\text{—}(G)_s\text{—}T^2]_z$$

wherein $\phi^2$ is or is derived from the residue of said second initiator free of said radically transferable group; $T^2$ is or is derived from said radically transferable group of said second initiator; x is independently from 1 to 100 for each structure; p and q are each independently within the range of 0 to 100 for each x-segment and for each structure, the sum of p and q being at least 1 for each x-segment, and q being at least 1 for at least one x-segment; r and s are each independently for each structure within the range of 0 to 100; z is independently for each structure at least 1; and said epoxy functional polymer has a polydispersity index of less than 2.0.

35. The method of claim 34 wherein said polycarboxylic acid functional polymer (i) has a carboxylic acid equivalent weight of from 100 to 10,000 grams/equivalent, said epoxy functional polymer (ii) has an epoxy equivalent weight of from 100 to 10,000 grams/equivalent, and said polycarboxylic acid functional polymer and said epoxy functional polymer each independently have a polydispersity index of less than 1.8.

36. The method of claim 34 wherein t is independently selected for each structure within the range of 1 to 20; u is independently selected for each structure within in the range of 1 to 20; p is independently selected for each structure within the range of 1 to 20; and q is independently selected for each structure within in the range of 1 to 20.

37. The method of claim 34 wherein v is independently selected for each structure within the range of 1 to 50; and x is independently selected for each structure within the range of 1 to 50.

38. The method of claim 34 wherein $T^1$ and $T^2$ are each independently halide.

39. The method of claim 38 wherein $T^1$ and $T^2$ are each independently derived from a dehalogenation post-reaction.

40. The method of claim 39 wherein said dehalogenation post-reaction comprises contacting independently each of said polycarboxylic acid functional polymer and said epoxy functional polymer with a limited radically polymerizable ethylenically unsaturated compound.

41. The method of claim 40 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

42. The method of claim 34 wherein $\phi^1$ and $\phi^2$ are the same or different.

43. The method of claim 24 wherein the equivalent ratio of carboxylic acid equivalents in said polycarboxylic acid functional polymer (i) to epoxy equivalents in said epoxy functional polymer (ii) is from 0.5:1 to 1.5:1.

44. The method of claim 24 wherein said polycarboxylic acid functional polymer (i) is present in said thermosetting composition in amounts of from 5 to 95 percent by weight, based on total resin solids weight, and said epoxy functional polymer (ii) is present in said thermosetting composition in an amount of from 5 to 95 percent by weight, based on total resin solids weight.

45. The method of claim 24 further comprising a second polycarboxylic acid functional material selected from the group consisting of: $C_4$ to $C_{20}$ dicarboxylic acids; carboxylic acid functional materials represented by the following general formula,

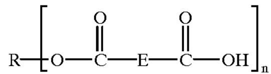

$$R\text{—}\left[O\text{—}\overset{O}{\overset{\|}{C}}\text{—}E\text{—}\overset{O}{\overset{\|}{C}}\text{—}OH\right]_n$$

wherein R is the residue of a polyol, E is a divalent linking group having from 2 to 10 carbon atoms, and n is an integer of from 2 to 10; and mixtures thereof.

46. The method of claim 45 wherein said dicarboxylic acid is selected from the group consisting of dodecanedioic acid, azelaic acid, adipic acid, 1,6-hexanedioic acid, succinic acid, pimelic acid, sebasic acid, maleic acid, itaconic acid, aconitic acid and mixtures thereof, said polyol from which R is derived is selected from the group consisting of ethylene glycol, di(ethylene glycol), trimethylolethane, trimethylolpropane, pentaerythritol, di-trimethylolpropane and di-pentaerythritol, E is selected from the group consisting of 1,2-cyclohexylene and 4-methyl-1,2-cyclohexylene, and n is an integer of from 2 to 6, said second polycarboxylic acid functional material being present in said thermosetting composition in an amount of from 1 percent to 25 percent by weight, based on the total weight of resin solids.

47. A substrate coated by the method of claim 24.

48. A multi-component composite coating composition comprising:

(a) a base coat deposited from a pigmented film-forming composition; and (b) a transparent top coat applied over said base coat, wherein said transparent top coat is deposited from a clear film-forming thermosetting composition comprising a co-reactable solid, particulate mixture of:

(i) polycarboxylic acid functional polymer prepared by atom transfer radical polymerization initiated in the presence of a first initiator having at least one radically transferable group, and in which said polycarboxylic acid functional polymer contains at least one of the following polymer chain structures:

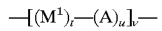

and

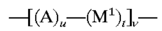

wherein $M^1$ is a residue, that is free of carboxylic acid functionality, of at least one ethylenically unsaturated radically polymerizable monomer; A is a residue, that has carboxylic acid functionality, of at least one ethylenically unsaturated radically polymerizable monomer; t and u represent average numbers of residues occurring in a block of residues in each polymer chain structure; and t, u and v are each independently selected for each structure such that said polycarboxylic acid functional polymer has a number average molecular weight of at least 250; and (ii) epoxy functional polymer prepared by atom transfer radical polymerization initiated in the presence of a second initiator having at least one radically transferable group, and in which said epoxy functional polymer contains at least one of the following polymer chain structures:

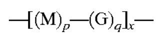

and

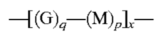

wherein M is a residue, that is free of oxirane functionality, of at least one ethylenically unsaturated radically polymerizable monomer; G is a residue, that has oxirane functionality, of at least one ethylenically unsaturated radically polymerizable monomer; p and q represent average numbers of residues occurring in a block of residues in each polymer chain structure; and p, q and x are each independently selected for each structure such that said epoxy functional polymer has a number average molecular weight of at least 250.

49. The multi-component composite coating composition of claim 48 wherein said polycarboxylic acid functional polymer (i) and said epoxy functional polymer (ii) are each independently selected from the group consisting of linear polymers, branched polymers, hyperbranched polymers, star polymers, graft polymers and mixtures thereof.

50. The multi-component composite coating composition of claim 48 wherein said polycarboxylic acid functional polymer (i) and said epoxy functional polymer (ii) each independently have a number average molecular weight of from 500 to 16,000, and a polydispersity index of less than 2.0.

51. The multi-component composite coating composition of claim 48 wherein said first and second initiators are each independently selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

52. The multi-component composite coating composition of claim 51 wherein said first and second initiators are each independently selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis(α-halo-$C_1$–$C_6$-alkyl)benzene, diethyl-2-halo-2-methyl malonate, ethyl 2-bromoisobutyrate and mixtures thereof.

53. The multi-component composite coating composition of claim 48 wherein said polycarboxylic acid functional polymer (i) has a carboxylic acid equivalent weight of from 100 to 10,000 grams/equivalent, and said epoxy functional polymer (ii) has an epoxy equivalent weight of from 100 to 10,000 grams/equivalent.

54. The multi-component composite coating composition of claim 48 wherein $M^1$ and M are each independently derived from at least one of vinyl monomers, allylic monomers and olefins.

55. The multi-component composite coating composition of claim 54 wherein $M^1$ and M are each independently derived from at least one of alkyl (meth)acrylates having from 1 to 20 carbon atoms in the alkyl group, vinyl aromatic monomers, vinyl halides, vinyl esters of carboxylic acids and olefins.

56. The multi-component composite coating composition of claim 48 wherein A is derived from: alkyl (meth)acrylate, which after polymerization is hydrolyzed; or at least one hydroxy functional ethylenically unsaturated radically polymerizable monomer, which after polymerization is post-reacted with a cyclic anhydride.

57. The multi-component composite coating composition of claim 48 wherein G is derived from at least one of glycidyl (meth)acrylate, 3,4-epoxycyclohexylmethyl(meth)acrylate, 2-(3,4-epoxycyclohexyl)ethyl(meth)acrylate and allyl glycidyl ether.

58. The multi-component composite coating composition of claim 48 wherein said polycarboxylic acid functional polymer (i) has at least one of the following polymer chain structures:

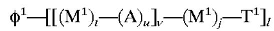

and

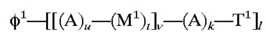

wherein $\phi^1$ is or is derived from the residue of said first initiator free of said radically transferable group; $T^1$ is or is derived from said radically transferable group of said first initiator; v is independently from 1 to 100 for each structure; t and u are each independently within the range of 0 to 100 for each v-segment and for each structure, the sum of t and u being at least 1 for each v-segment, and u being at least 1 for at least one v-segment; j and k are each independently for each structure within the range of 0 to 100; l is independently for each structure at least 1; and said polycarboxylic acid functional polymer has a polydispersity index of less than 2.0; and said epoxy functional polymer (ii) has at least one of the following polymer chain structures:

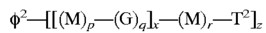

and

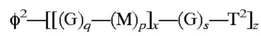

wherein $\phi^2$ is or is derived from the residue of said second initiator free of said radically transferable group; $T^2$ is or is derived from said radically transferable group of said second initiator; x is independently from 1 to 100 for each structure; p and q are each independently within the range of 0 to 100 for each x-segment and for each structure, the sum of p and q being at least 1 for each x-segment, and q being at least 1 for at least one x-segment; r and s are each independently for each structure within the range of 0 to 100; z is independently for each structure at least 1; and said epoxy functional polymer has a polydispersity index of less than 2.0.

59. The multi-component composite coating composition of claim 58 wherein said polycarboxylic acid functional polymer (i) has a carboxylic acid equivalent weight of from 100 to 10,000 grams/equivalent, said epoxy functional polymer ( ii) has an epoxy equivalent weight of from 100 to 10,000 grams/equivalent, and said polycarboxylic acid functional polymer and said epoxy functional polymer each independently have a polydispersity index of less than 1.8.

60. The multi-component composite coating composition of claim 58 wherein t is independently selected for each structure within the range of 1 to 20; u is independently selected for each structure within in the range of 1 to 20; p is independently selected for each structure within the range of 1 to 20; and q is independently selected for each structure within in the range of 1 to 20.

61. The multi-component composite coating composition of claim 58 wherein v is independently selected for each structure within the range of 1 to 50; and x is independently selected for each structure within the range of 1 to 50.

62. The multi-component composite coating composition of claim 58 wherein $T^1$ and $T^2$ are each independently halide.

63. The multi-component composite coating composition of claim 62 wherein $T^1$ and $T^2$ are each independently derived from a dehalogenation post-reaction.

64. The multi-component composite coating composition of claim 63 wherein said dehalogenation post-reaction comprises contacting independently each of said polycarboxylic acid functional polymer and said epoxy functional polymer with a limited radically polymerizable ethylenically unsaturated compound.

65. The multi-component composite coating composition of claim 64 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

66. The multi-component composite coating composition of claim 58 wherein $\phi^1$ and $\phi^2$ are the same or different.

67. The multi-component composite coating composition of claim 48 wherein the equivalent ratio of carboxylic acid equivalents in said polycarboxylic acid functional polymer (i) to epoxy equivalents in said epoxy functional polymer (ii) is from 0.5:1 to 1.5:1.

68. The multi-component composite coating composition of claim 48 wherein said polycarboxylic acid functional polymer (i) is present in said thermosetting composition in amounts of from 5 to 95 percent by weight, based on total resin solids weight, and said epoxy functional polymer (ii) is present in said thermosetting composition in an amount of from 5 to 95 percent by weight, based on total resin solids weight.

69. The multi-component composite coating composition of claim 48 wherein said clear film-forming thermosetting composition further comprises a second polycarboxylic acid functional material selected from the group consisting of: $C_4$ to $C_{20}$ dicarboxylic acids; carboxylic acid functional materials represented by the following general formula,

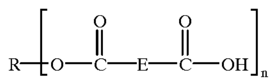

wherein R is the residue of a polyol, E is a divalent linking group having from 2 to 10 carbon atoms, and n is an integer of from 2 to 10; and mixtures thereof.

70. The multi-component composite coating composition of claim 69 wherein said dicarboxylic acid is selected from the group consisting of dodecanedioic acid, azelaic acid, adipic acid, 1,6-hexanedioic acid, succinic acid, pimelic acid, sebasic acid, maleic acid, itaconic acid, aconitic acid and mixtures thereof, said polyol from which R is derived is selected from the group consisting of ethylene glycol, di(ethylene glycol), trimethylolethane, trimethylolpropane, pentaerythritol, di-trimethylolpropane and di-pentaerythritol, E is selected from the group consisting of 1,2-cyclohexylene and 4-methyl-1,2-cyclohexylene, and n is an integer of from 2 to 6, said second polycarboxylic acid functional material being present in said thermosetting composition in an amount of from 1 percent to 25 percent by weight, based on the total weight of resin solids.

71. A substrate having said multi-component composite coating composition of claim 48 deposited thereon.

72. A substrate having said multi-component composite coating composition of claim 58 deposited thereon.

* * * * *